United States Patent
Inohiza (10) Patent No.: US 12,457,654 B2
(45) Date of Patent: Oct. 28, 2025

(54) COMMUNICATION APPARATUS, CONTROL METHOD, AND STORAGE MEDIUM

(71) Applicant: CANON KABUSHIKI KAISHA, Tokyo (JP)

(72) Inventor: Hirohiko Inohiza, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 18/175,354

(22) Filed: Feb. 27, 2023

(65) Prior Publication Data

US 2023/0209632 A1 Jun. 29, 2023

Related U.S. Application Data (63) Continuation of application No. PCT/JP2021/031732, filed on Aug. 30, 2021.

(30) Foreign Application Priority Data

Sep. 2, 2020 (JP) .................................. 2020-147490

(51) Int. Cl.
*H04W 76/00* (2018.01)
*H04W 76/15* (2018.01)

(52) U.S. Cl.
CPC .................................. *H04W 76/15* (2018.02)

(58) Field of Classification Search
None
See application file for complete search history.

(56) References Cited

U.S. PATENT DOCUMENTS

| | | | |
|---|---|---|---|
| 9,008,062 B2* | 4/2015 | Sun ....................... | H04W 48/12 370/338 |
| 9,699,715 B2* | 7/2017 | Kim ....................... | H04W 48/16 |
| 2015/0230093 A1* | 8/2015 | Park .................. | H04W 72/0453 726/4 |
| 2018/0206174 A1 | 7/2018 | Zhou et al. | |
| 2019/0014538 A1* | 1/2019 | Patil .................. | H04W 52/0229 |
| 2019/0082382 A1* | 3/2019 | Homchaudhuri ........................... | H04W 52/0225 |

(Continued)

FOREIGN PATENT DOCUMENTS

| | | |
|---|---|---|
| CN | 102752823 A | 10/2012 |
| CN | 104471987 A | 3/2015 |

(Continued)

OTHER PUBLICATIONS

Cheng Chen et al., "Restrictions on MLD Probe" IEEE 802.11-20/1141r0, Aug. 2020 (Year: 2020).*

(Continued)

*Primary Examiner* — Khaled M Kassim
*Assistant Examiner* — Ahmed Saifuddin
(74) *Attorney, Agent, or Firm* — Canon U.S.A., Inc., IP Division (57) ABSTRACT

An AP 102 performs control such that in a case where a communication is being performed using a plurality of established different links via a plurality of different channels, a FILS discovery frame and/or an unsolicited probe response frame is not transmitted at an interval of 20 or smaller TUs (Time Units), while in a case where a communication is not being performed using the plurality of links, a FILS discovery frame and/or an unsolicited probe response frame is transmitted at an interval of 20 or smaller TUs.

11 Claims, 9 Drawing Sheets

(56) References Cited

U.S. PATENT DOCUMENTS

| | | | |
|---|---|---|---|
| 2020/0112910 A1 | 4/2020 | Cherian | |
| 2020/0137651 A1 | 4/2020 | Cariou et al. | |
| 2020/0213933 A1* | 7/2020 | Patil | H04W 80/08 |
| 2020/0221545 A1 | 7/2020 | Stacey | |
| 2021/0321243 A1* | 10/2021 | Patil | H04W 76/15 |
| 2023/0224996 A1* | 7/2023 | Kim | H04W 12/06 370/329 |
| 2023/0345349 A1* | 10/2023 | Kim | H04W 48/16 |

FOREIGN PATENT DOCUMENTS

| | | |
|---|---|---|
| CN | 104823488 A | 8/2015 |
| CN | 110199549 A | 9/2019 |
| JP | 2018050133 A | 3/2018 |
| JP | 2019111759 A | 7/2019 |
| WO | 2018136519 A1 | 7/2018 |

OTHER PUBLICATIONS

Cheng Chen, et al., Intel; Restrictions on MLD Probe; IEEE 802.11-20/1141r0; Aug. 26, 2020; pp. 1-13.
Jarkko Kneckt, et al., Apple Inc.; AP MLD Beaconing and Discovery, IEEE 802.11-20/865r1, Jul. 22, 2020; pp. 1-25.
Jiang Junfeng et al., Analysis of in-sequence frame delay for the AM-RLC scheme, 2007, pp. 1627-1630, vol. 47, No. 10, Beijing, China.
Carrier Wi-Fi Working Group, Carrier Wi-Fi Guidelines, Feb. 7, 2014.
Laurent Cariou et al., CR for 6 GHz—Discovery, doc.:IFEE 802.11-18/1227r14, Jan. 14, 2019.
Alfred Asterjadhi et al., Comment resolutions for miscellaneous CIDs in clause 26.17, doc.:IFEE 802.11-20/0450r3, Mar. 24, 2020.
Namyeong Kim et al., MLO: Information Exchange for Link Switching, doc.:IFEE 802.11-20/0411r4, Mar. 16, 2020.

* cited by examiner

COMMUNICATION APPARATUS, CONTROL METHOD, AND STORAGE MEDIUM

CROSS-REFERENCE TO RELATED APPLICATIONS

This application is a Continuation of International Patent Application No. PCT/JP2021/031732, filed Aug. 30, 2021, which claims the benefit of Japanese Patent Application No. 2020-147490, filed Sep. 2, 2020, both of which are hereby incorporated by reference herein in their entireties.

TECHNICAL FIELD

The present invention relates to transmission and reception of information related to communication in wireless communication.

BACKGROUND ART

IEEE 802.11 series is known as a WLAN communication standard established by IEEE (Institute of Electrical and Electronics Engineers). Note that WLAN is an abbreviation for Wireless Local Area Network. The IEEE 802.11 series standards include IEEE 802.11a/b/g/n/ac/ax standards. PTL 1 describes that wireless communication according to the IEEE 802.11ax standard is executed by OFDMA (Orthogonal Frequency Division Multiple Access).

According to the IEEE 802.11ax standard, in addition to the beacon frame, an AP can transmit a FILS discovery frame at a shorter interval than the beacon frame in order to notify an STA of information on wireless communication. An unsolicited probe response frame can be transmitted in addition to or instead of the FILS discovery frame.

In the IEEE, to achieve a further improvement in throughput and frequency utilization efficiency, development of IEEE 802.11be standard is ongoing, which will be a new standard in IEEE 802.11 series. In the development of IEEE 802.11be standard, it is considered to allow multi-link communication in which one AP establishes a plurality of links with one STA (Station) in frequency bands such as 2.4 GHz, 5 GHz, and 6 GHz bands for simultaneous communication.

When an AP that supports the multi-link communication executes multi-link communication, the AP may store information on the multi-link communication in a FILS discovery frame or an unsolicited probe response frame that is to be transmitted by the AP.

However, this causes an increase in the amount of information contained in these frames, which may cause an increase in a communication overhead depending on the frequency with which the frames are transmitted.

CITATION LIST

Patent Literature

PTL 1 Japanese Patent Laid-Open No. 2018-50133

SUMMARY OF INVENTION

In view of the above problem, an object of the present invention is to suppress the communication overhead by appropriately transmitting a FILS discovery frame and/or an unsolicited probe response frame.

To achieve the above object, the present invention provides a communication apparatus including an establishment unit configured to establish a plurality of links with another communication apparatus via a plurality of different channels, and a control unit configured to perform control such that in a case where a communication is being performed using the plurality of links established by the establishment unit, a FILS discovery frame and/or an unsolicited probe response frame is not transmitted at an interval of 20 or smaller TUs (Time Units), while in a case where a communication is not being performed using the plurality of links established by the establishment unit, a FILS discovery frame and/or an unsolicited probe response frame is transmitted at an interval of 20 or smaller TUs.

Further features of the present invention will become apparent from the following description of exemplary embodiments with reference to the attached drawings.

DESCRIPTION OF EMBODIMENTS

Embodiments of the present invention are described in detail below with reference to the accompanying drawings. Note that configurations shown in the following embodiments are merely examples, and the present invention is not limited to these configurations illustrated below.

Figure 1:
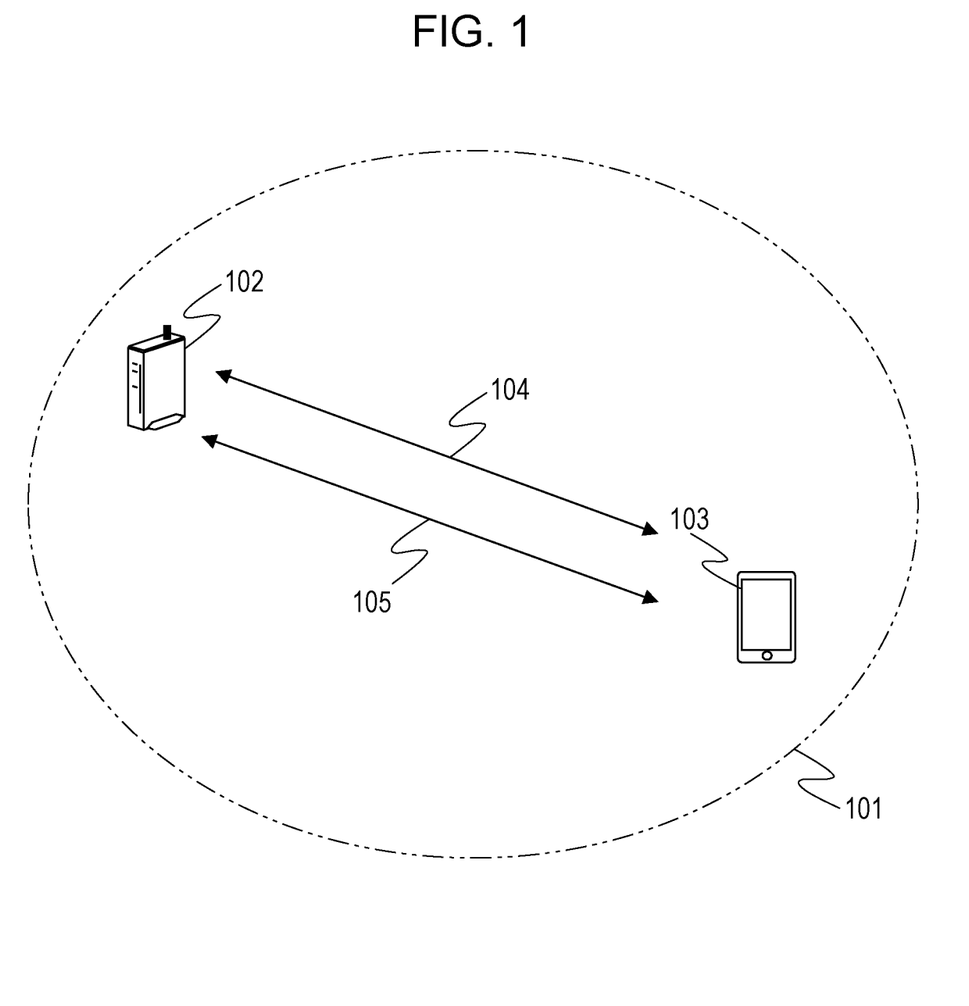
FIG. 1 is a diagram illustrating an example of a configuration of a network in which an AP 102 participates.

FIG. 1 illustrates a configuration of a network in which an AP (Access Point) 102 according to the present embodiment participates. The AP 102 is a communication apparatus that serves to establish a network 101. Note that the network 101 is a wireless network.

An STA (Station) 103 is a communication apparatus that participates in the network 101. Each communication apparatus supports the IEEE 802.11be (EHT) standard, and can perform wireless communication according to the IEEE 802.11be standard via the network 101. Note that IEEE is an abbreviation for Institute of Electrical and Electronics Engineers.

EHT is an abbreviation for Extremely High Throughput. Note that EHT may be interpreted as an abbreviation for Extreme High Throughput. Each communication apparatus is capable of communicating in frequency bands of 2.4 GHz band, 5 GHz band, and 6 GHz band. The frequency bands used by each communication apparatus are not limited to those, and other different frequency bands such as a 60 GHz band may be used. Each communication apparatus may use a bandwidth of 20 MHz, 40 MHz, 80 MHz, 160 MHz, or 320 MHz in communication.

The AP 102 and the STA 103 can perform multi-user (MU) communication in which signals of a plurality of users are multiplexed by executing OFDMA communication according to the IEEE 802.11be standard. OFDMA is an abbreviation for Orthogonal Frequency Division Multiple Access. In the OFDMA communication, a part of the divided frequency bands (RU, Resource Unit) is assigned to each STA such that there is no overlap and carrier waves assigned to the respective STAs are orthogonal to each other. This makes it possible for the AP to communicate with a plurality of STAs in parallel.

The AP 102 and the STA 103 establish links via a plurality of frequency channels thereby performing multi-link communication. The AP that performs multi-link communication is also called an AP MLD (Multi-Link Device). Here, the frequency channel refers to a frequency channel defined by the IEEE 802.11 series standard and capable of executing wireless communication according to the IEEE 802.11 series standard. In the IEEE 802.11 series standards, a plurality of frequency channels are defined in each of the 2.4 GHz, 5 GHz, and 6 GHz frequency bands. According to the IEEE 802.11 series standards, 20 MHz is allocated as a band width to each of frequency channels. By bonding adjacent frequency channels, a bandwidth of 40 MHz or greater may be used in one frequency channel. For example, the AP 102 may establish a first link 104 with the STA 103 via a first frequency channel in the 2.4 GHz band and a second link 105 via a second frequency channel in the 5 GHz band, thereby making it possible to communicate with the STA 103 via both links. In this case, the AP 102 maintains the second link 105 via the second frequency channel in parallel with the first link 104 via the first frequency channel. In this manner, the AP 102 can improve throughput in communication with the STA 103 by establishing links with the STA 103 via a plurality of frequency channels. Note that the AP 102 and the STA 103 may establish a plurality of links with different frequency bands in multi-link communication. For example, the AP 102 and the STA 103 may establish a third link in the 6 GHz band in addition to the first link 104 in the 2.4 GHz band and the second link 105 in the 5 GHz band. Alternatively, links may be established via a plurality of different channels included in the same frequency band. For example, a first link 104 via 1ch in the 2.4 GHz band and a second link 105 via 5ch in the 2.4 GHz band may be established. Note that it is also allowed to establish a mixture of links in the same frequency band and links in different frequency bands. For example, the AP 102 and the STA 103 may establish a third link via 36ch in the 5 GHz band in addition to the first link 104 via 1ch in the 2.4 GHz band and the second link 105 via 5ch in the 2.4 GHz band. If a plurality of connections with the STA 103 in different frequency bands is established, then even when one band is congested, the AP 102 can communicate with the STA 103 via a different band, and thus it is possible to prevent the throughput from decreasing in communication with STA 103.

In the multi-link communication, the plurality of links established between the AP 102 and the STA 103 should be different at least in the frequency channel. In the multi-link communication, the frequency channel spacing of the plurality of links established between the AP 102 and the STA 103 should be at least greater than 20 MHz. In the present embodiment, it is assumed that the AP 102 and the STA 103 establish the first link 104 and the second link 105, but three or more links may be established.

Note that when multi-link communication is executed, the AP 102 establishes a plurality of wireless networks corresponding to the respective links. In this case, the AP 102 internally has a plurality of APs each of which is controlled to establish a wireless network for it. The APs provided inside the AP 102 may be one or more physical APs, or may be a plurality of virtual APs configured on one physical AP. When a plurality of links are established in frequency channels belonging to a common frequency band, the plurality of links may use a common wireless network.

When multi-link communication is performed, the AP 102 and the STA 103 divide one piece of data and transmit the divided pieces of data to the partner device via the plurality of links. Alternatively, the AP 102 and the STA 103 each may transmit the same data via the plurality of links such that communication via one link serves as backup communication for the communication via the other link. More specifically, the AP 102 may transmit to the STA 103 the same data via a first link in a first frequency channel and via a second link in a second frequency channel. In this case, for example, even if an error occurs in communication via the first link, the STA 103 can receive the data transmitted from the AP 102 because the same data is transmitted via the second link. Alternatively, the AP 102 and the STA 103 may adaptively use links depending on the type of frame or data to be communicated. For example, the AP 102 may transmit a management frame via the first link and a data frame containing data via the second link. Note that the management frame refers specifically to a beacon frame, a probe request frame/response frame, or an association request frame/response frame.

In addition to these frames, a disassociation frame, an authentication frame, a de-authentication frame, and an action frame are also called management frames. The beacon frame is a frame for providing network information. The probe request frame is a frame for requesting network information, and the probe response frame is a frame to provide network information in response to the probe request frame. The association request frame is a frame for requesting a connection, and the association response frame is a frame that indicates, in response to the association request frame, a permission for the connection, an error, or the like. The disassociation frame is a frame for disconnecting a connection. The authentication frame is a frame for authenticating a partner device, and the de-authentication frame is a frame for interrupting the authentication of the partner device and disconnecting the connection. The action frame is a frame for performing an additional function other than those described above. The AP 102 and the STA 103 transmit and receive a management frame according to the IEEE 802.11 series standards. Alternatively, when the AP 102 transmits data related to a captured image, for example, meta information indicating a date, image-capturing parameters (an aperture value, a shutter speed, etc.), position information, and/or the like may be transmitted via the first link, and pixel information may be transmitted via the second link.

The AP 102 and the STA 103 may be capable of performing MIMO (Multiple-Input And Multiple-Output) communication. In this case, the AP 102 and the STA 103 each have a plurality of antennas and one of the AP 102 and the STA 103 transmits different signals from the respective antennas using the same frequency channel. A receiving device simultaneously receives all signals arriving via a plurality of streams using the plurality of antennas, and separates the signals of the respective streams and decodes them.

The executing of the MIMO communication in the above-described manner makes it possible for the AP 102 and the STA 103 to communicate more data in the same time period than when the MIMO communication is not executed. When the AP 102 and the STA 103 perform multi-link communication, the MIMO communication may be performed using only a part of links.

To broadcast network information, the AP 102 may transmit a FILS discovery frame and/or an unsolicited probe response frame in addition to the beacon frame. FILS is an abbreviation for Fast Initial Link Setup.

The AP 102 may incorporate information on a plurality of APs used by the AP 102 into an RNR (Reduced Neighbor Report) element in a FILS discovery frame. More specifically, the RNR element may include information on the operating class of each AP, channel information, and beacon frame transmission timing. When the AP 102 is in a multi-link operation, the AP 102 may incorporate information on the plurality of APs used in the multi-link operation into the FILS discovery frame. Note that the FILS discovery frame contains less information than the beacon frame.

The AP 102 may incorporate information similar to that included in a normal probe response frame into the unsolicited probe response frame. Note that unlike the normal probe response frame, the unsolicited probe response frame is a frame autonomously transmitted by the AP 102 at predetermined time intervals. The AP 102 that supports multi-link communication may incorporate an RNR element including information on the multi-link of the AP 102 into the unsolicited probe response frame. The RNR element includes information common to the plurality of links established by the AP 102.

The IEEE 802.11ax standard stipulates that when an AP operates in the 6 GHz band, the AP may transmit a FILS discovery frame and/or an unsolicited probe response frame at intervals of 20 TUs. Note that TU is an abbreviation for Time Unit, and 1 TU corresponds to 1 ms. In this case, the AP transmits the FILS discovery frame and/or the unsolicited probe response frame at intervals shorter than the beacon frame transmission interval of 100 TUs.

When the AP 102 establishes a plurality of links including the 6 GHz band and performs multi-link communication, if the frames containing information on the multi-link communication are transmitted at intervals of 20 TUs, a reduction in communication throughput may occur. To handle this situation, according to the present embodiment, the AP 102 appropriately sets the transmission intervals of these frames based on whether multi-link communication is being performed, thereby suppressing a reduction in communication throughput.

Although it is assumed above that the AP 102 and the STA 103 support the IEEE 802.11be standard, the AP 102 and the STA 103 may further support at least one of the legacy standards prior to the IEEE 802.11be standard. The legacy standards include the IEEE 802.11a/b/g/n/ac/ax standards. In the present embodiment, at least one of the IEEE 802.11a/b/g/n/ac/ax/be standards is referred to as an IEEE 802.11 series standard. In addition to the IEEE 802.11 series standards, other communication standards such as Bluetooth (registered trademark), NFC, UWB, Zigbee, MBOA, and/or the like may be supported. UWB is an abbreviation for Ultra Wide Band, and MBOA is an abbreviation for Multi Band OFDM Alliance. OFDM is an abbreviation for Orthogonal Frequency Division Multiplexing. NFC is an abbreviation for Near Field Communication. UWB includes wireless USB, wireless 1394, Winet, etc. A communication standard for wired communication such as a wired LAN may be supported.

Specific examples of the AP 102 include, but are not limited to, a wireless LAN router and a PC. Any communication apparatus may be used as the AP 102 as long as it can execute multi-link communication with another communication apparatus. The AP 102 may be an information processing apparatus such as a wireless chip capable of executing wireless communication according to the IEEE 802.11be standard. Specific examples of the STA 103 include, but are not limited to, a camera, a tablet device, a smartphone, a PC, a mobile phone, a video camera, etc. Any communication apparatus may be used as the STA 103 as long as it can execute multi-link communication with another communication apparatus. The STA 103 may be an information processing apparatus such as a wireless chip capable of executing wireless communication according to the IEEE 802.11be standard. The network shown in FIG. 1 includes one AP and one STA, but the number of APs and the number of STAs are not limited to one. Note that an information processing apparatus such as a wireless chip has an antenna for transmitting a generated signal.

Although it is assumed in the present embodiment that the AP 102 is an access point and the STA 103 is a station, this is by way of example. For example, the AP 102 and the STA 103 both may be stations. In this case, although the AP 102 is a station, the AP 102 operates as an apparatus responsible for configuring a wireless network for establishing a link with the STA 103.

Figure 2:
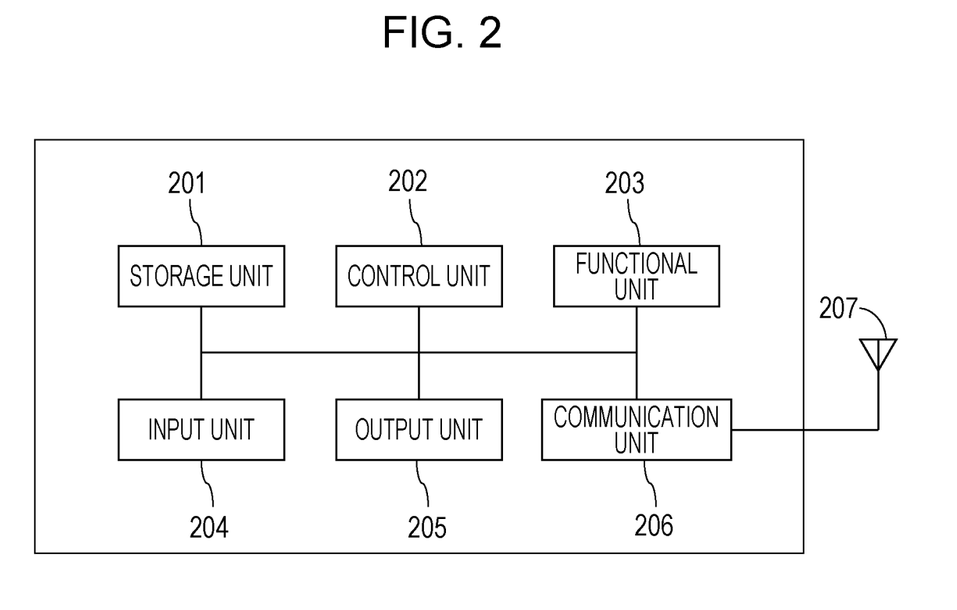
FIG. 2 is a diagram illustrating an example of a hardware configuration of an AP 102.

FIG. 2 illustrates an example of a hardware configuration of the AP 102. The AP 102 includes a storage unit 201, a control unit 202, a functional unit 203, an input unit 204, an output unit 205, a communication unit 206, and an antenna 207.

The storage unit 201 includes one or more memories such as a ROM, a RAM and/or the like, and serves to store a computer program for performing various operations described later and various kinds of information such as a communication parameter for wireless communication. ROM is an abbreviation for Read Only Memory, and RAM is an abbreviation for Random Access Memory. Examples of the storage unit 201 include, in addition to memories such as a ROM, a RAM or the like, a storage medium such as a flexible disk, a hard disk, an optical disk, a magneto-optical disk, a CD-ROM, a CD-R, a magnetic tape, a non-volatile memory card, and a DVD. The storage unit 201 may include a plurality of memories or the like.

The control unit 202 includes, for example, one or more processors such as a CPU and an MPU, and controls the entire AP 102 by executing a computer program stored in the storage unit 201. The control unit 202 may control the entire AP 102 in cooperation with the computer program stored in the storage unit 201 and an OS (Operating System). The control unit 202 generates data or a signal (a wireless frame) to be transmitted in communication with another communication apparatus. Note that CPU is an abbreviation for Central Processing Unit, and MPU is an abbreviation for Micro Processing Unit. The control unit 202 may include a plurality of processors such as a multi-core processor, and may control the entire AP 102 by using the plurality of processors.

The control unit 202 controls the functional unit 203 to execute predetermined processing such as wireless communication, imaging, printing, projecting, or the like. The functional unit 203 is a hardware unit by which the AP 102 executes predetermined processing.

The input unit 204 accepts various operations by a user. The output unit 205 provides various outputs to the user via a monitor screen and/or a speaker. The outputs by the output unit 205 may be provided by displaying information on a monitor screen, audio information via a speaker, or providing a vibration, or the like. Note that the input unit 204 and the output unit 205 may be integrated in one module as in a touch panel. The input unit 204 and the output unit 205 each may be integrated with or separate from the AP 102.

The communication unit 206 controls wireless communication in accordance with the IEEE 802.11be standard. The communication unit 206 may control wireless communication according to other IEEE 802.11 series standards in addition to the IEEE 802.11be standard, or may control wired communication such as a wired LAN. The communication unit 206 controls the antenna 207 to transmit and receive signals for wireless communication generated by the control unit 202. The AP 102 may include a plurality of communication units 206. The AP 102 including the plurality of communication units 206 establishes at least one link for each communication unit 206 when a plurality of links are established in multi-link communication. Alternatively, the AP 102 may establish a plurality of links using one communication unit 206. In this case, the communication unit 206 performs communication via the plurality of links by switching frequency channels in a time division manner. Note that in a case where the AP 102 supports the NFC standard, the Bluetooth standard, and/or the like in addition to the IEEE 802.11be standard, wireless communication may be controlled in accordance with these communication standards. In a case where the AP 102 is capable of executing wireless communication according to a plurality of communication standards, communication units and antennas may be provided separately for the respective communication standards. The AP 102 communicates data such as image data, document data, video data, and/or the like with the STA 103 via the communication unit 206. The antenna 207 may be provided separately from the communication unit 206, or may be integrated with the communication unit 206 in a single module.

The antenna 207 is an antenna capable of performing communication in the 2.4 GHz band, 5 GHz band, and 6 GHz band. Although it is assumed above that the AP 102 has one antenna in the present embodiment, the AP 102 may have a plurality of antennas for the respective frequency bands. In the case where the AP 102 has a plurality of antennas, the AP 102 may have a plurality of communication units 206 corresponding to the respective antennas.

Note that the STA 103 has a hardware configuration similar to that of the AP 102.

Figure 3:
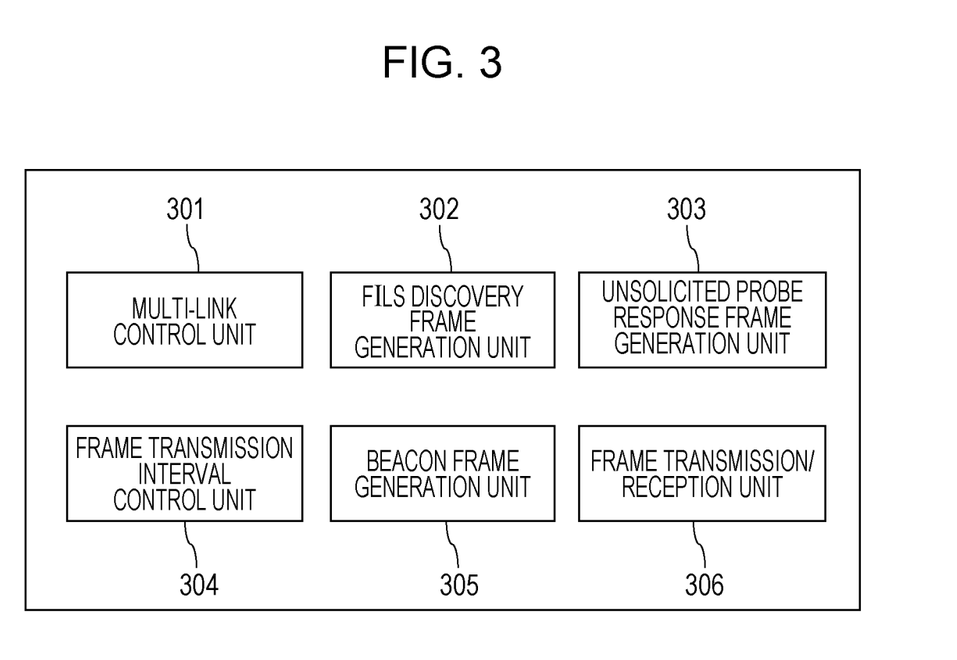
FIG. 3 is a diagram illustrating an example of a functional configuration of the AP 102.

FIG. 3 illustrates an example of a functional configuration of the AP 102. The AP 102 includes a multi-link control unit 301, a FILS discovery frame generation unit 302, and an unsolicited probe response frame generation unit 303. The AP 102 further includes a frame transmission interval control unit 304, a beacon frame generation unit 305, and a frame transmission/reception unit 306.

The multi-link control unit 301 controls whether the AP 102 performs multi-link communication or single-link communication. The single-link communication is a link performed such that the AP 102 establishes only a single link and performs the communication using it. The determination as to whether the AP 102 performs multi-link communication may be set by a user, or may be determined by the AP 102 according to a channel usage state.

The FILS discovery frame generation unit 302 generates a FILS discovery frame depending on the multi-link communication by the AP 102 or the frequency band used by the AP 102.

The unsolicited probe response frame generation unit 303 generates an unsolicited probe response frame depending on the multi-link communication by the AP 102 or the frequency band used by the AP 102.

The frame transmission interval control unit 304 controls transmission intervals of beacon frames, FILS discovery frames, and unsolicited probe response frames transmitted by the AP 102. The beacon frames are transmitted at intervals of 100 TUs, while the FILS discovery frames and the unsolicited probe response frames are transmitted at intervals shorter than 100 TUs.

The beacon frame generation unit 305 generates a beacon frame. The beacon frame includes an unsolicited probe responses active subfield, which is a flag indicating whether to transmit an unsolicited probe response frame. The unsolicited probe responses active subfield is included in a neighbor report element and an RNR element. The beacon frame may include an RNR element including information about the multi-link communication performed by the AP 102.

The frame transmission/reception unit 306 controls transmission/reception of management frames such as beacon frames, FILS discovery frames, and unsolicited probe response frames, and controls transmission/reception of control frames, and data frames.

Figure 4:
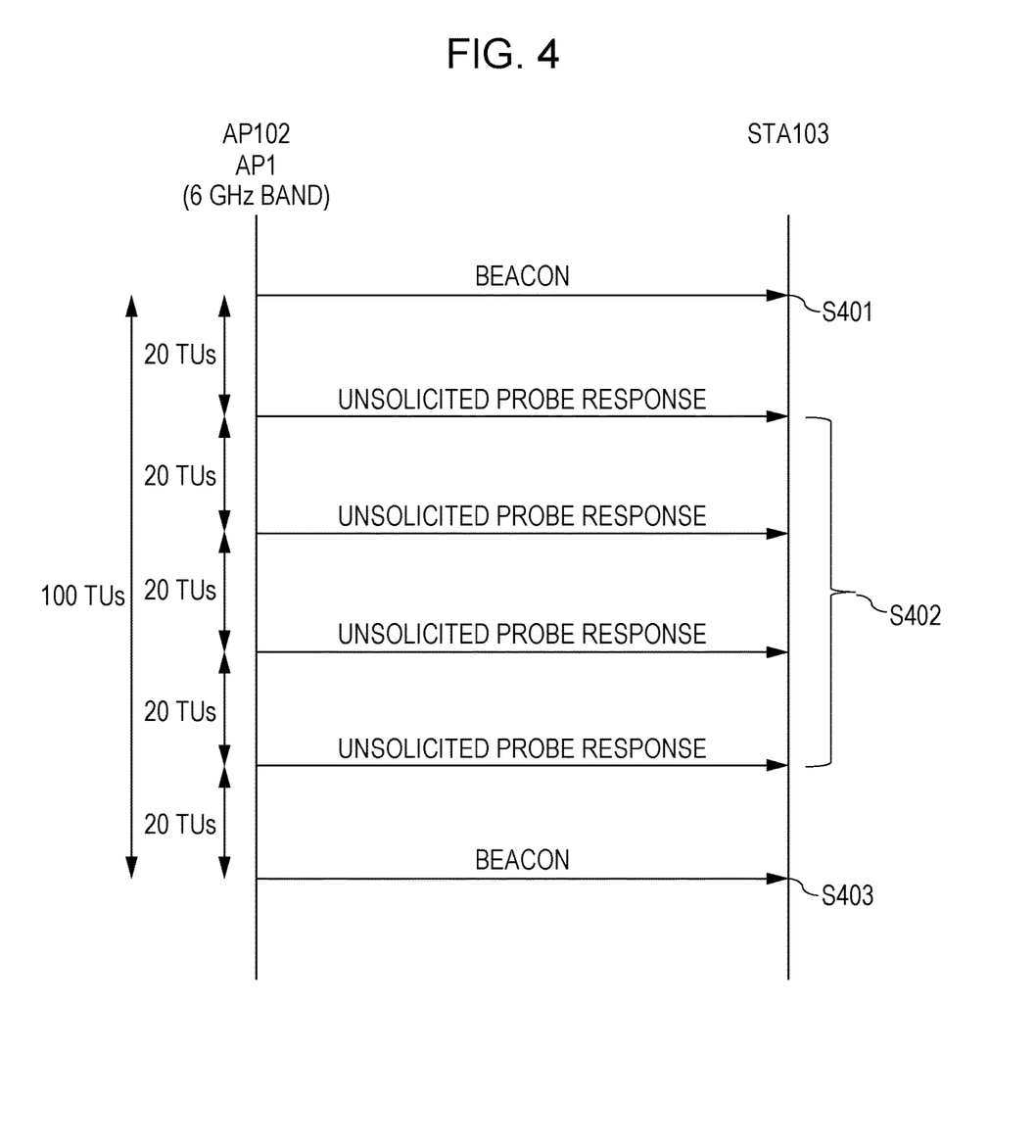
FIG. 4 is a sequence diagram illustrating an example of processing executed when the AP 102 communicates with an STA 103 via a single link.

FIG. 4 is a sequence diagram illustrating processing executed when the AP 102 communicates with the STA 103 via a single link. In the example shown in FIG. 4, the AP 102 performs a single-link communication. The processing of this sequence is started when the power of the AP 102 is turned on. Alternatively, the processing may be started in response to a user instructing the AP 102 to perform a single-link communication. The AP 102 operates an AP1 and performs single-link communication with the STA 103. Note that the AP1 operates in the 6 GHz band.

The AP 102 transmits a beacon frame containing information about the AP1 (S401). Next, since the AP 102 is communicating in the 6 GHz band, the AP 102 transmits an unsolicited probe response frame (S402). The AP 102 transmits the unsolicited probe response frame at intervals of 20 TUs.

When 100 TUs has passed since the previous transmission of the beacon frame, the AP 102 again transmits a beacon frame (S403).

As described above, in the case where the AP 102 performs single-link communication in the 6 GHz band, the AP 102 transmits the unsolicited probe response frames at intervals of 20 TUs between adjacent transmissions of the beacon frame. The unsolicited probe response frame transmitted here does not include information about a plurality of APs used for multi-link communication, and this results in a reduction in communication overhead. Therefore, the AP 102 transmits unsolicited probe response frames at short intervals of 20 TUs. Although in the processing in FIG. 4, it is assumed that the AP 102 transmits unsolicited probe response frames, a FILS discovery frame may be transmitted instead of at least one unsolicited probe response frame.

Figure 5:
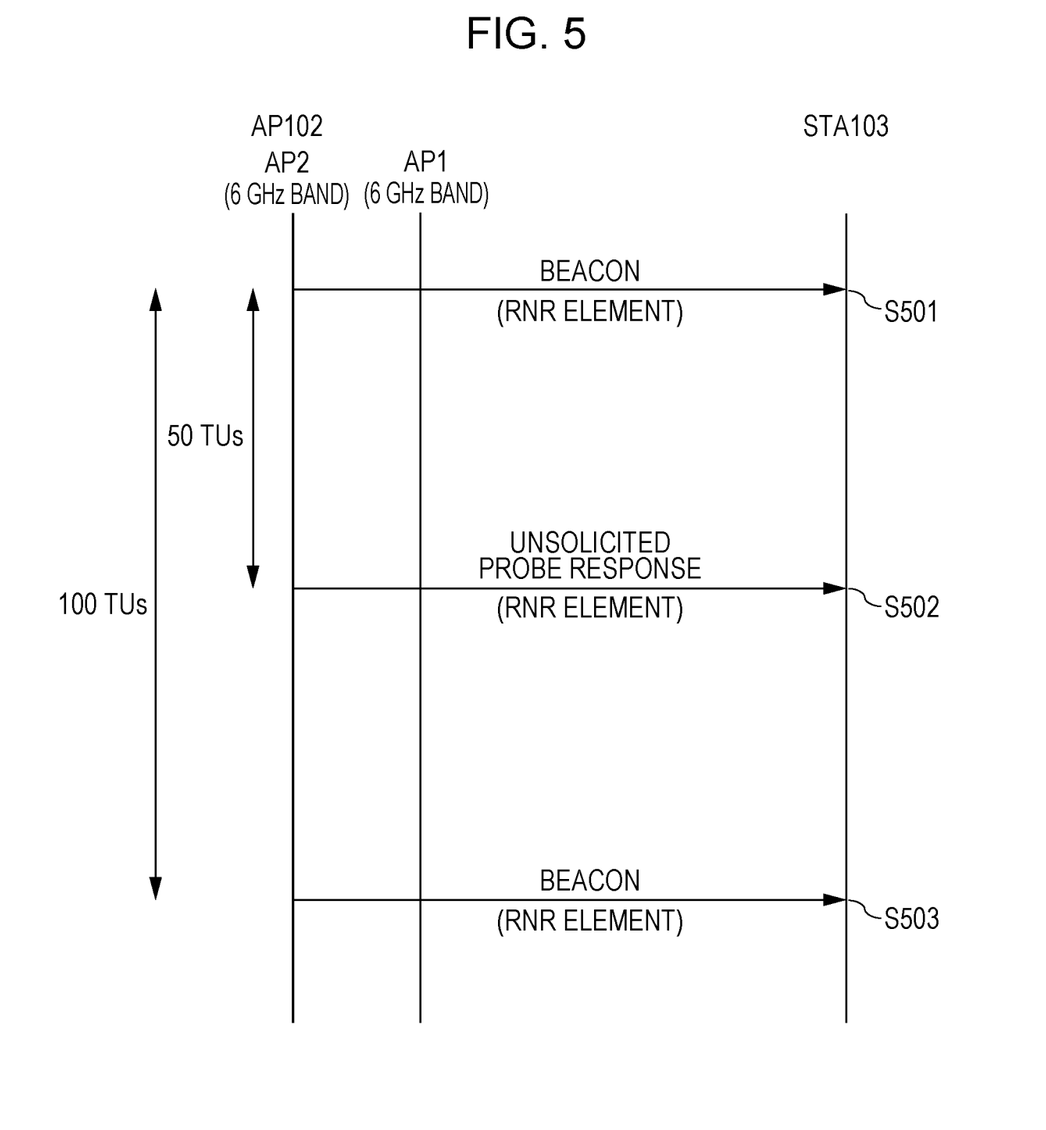
FIG. 5 is a sequence diagram illustrating an example of processing executed when the AP 102 communicates with the STA 103 via a plurality of links.

FIG. 5 is a sequence diagram illustrating processing executed when the AP 102 communicates with the STA 103 via multiple links. In the example shown in FIG. 5, the AP 102 performs a multi-link communication. The processing of this sequence is started when the power of the AP 102 is turned on. Alternatively, the processing may be started in response to a user instructing the AP 102 to perform a multi-link communication. The AP 102 operates an AP1 and an AP 2 to perform multi-link communication with the STA 103. Note that the AP1 and AP2 operate in the 6 GHz band using frequency channels different from each other.

The AP 102 transmits a beacon frame using the AP2 (S501). The beacon frame transmitted in this step includes an RNR element including information common to the links established by the AP1 and the AP2. Next, the AP 102 transmits, using the AP2, an unsolicited probe response frame including an RNR element (S502). The AP 102 transmits unsolicited probe response frames at intervals of 50 TUs, longer than 20 TUs. When 100 TUs has passed since the previous transmission of the beacon frame, the AP 102 again transmits a beacon frame using the AP2 (S503). In this sequence, it is assumed that the AP 102 uses the AP2. However, the sequence may be performed using the AP1.

As described above, in the case where the AP 102 performs multi-link communication, the AP 102 transmits the unsolicited probe response frames at intervals of 50 TUs longer than 20 TUs between adjacent transmissions of the beacon frame. The unsolicited probe response frame transmitted here includes information about a plurality of APs used for the multi-link communication, and this results in an increase in communication overhead. Therefore, the AP 102 transmits unsolicited probe response frames at intervals of 50 TUs longer than 20 TUs. In this sequence, the transmission interval of the unsolicited probe response frames is set to 50 TUs, but the interval is not limited to this and may be set to an arbitrary value longer than 20 TUs. Although in the processing in FIG. 5, it is assumed that the AP 102 transmits unsolicited probe response frames, a FILS discovery frame may be transmitted instead of at least one unsolicited probe response frame.

Figure 6:
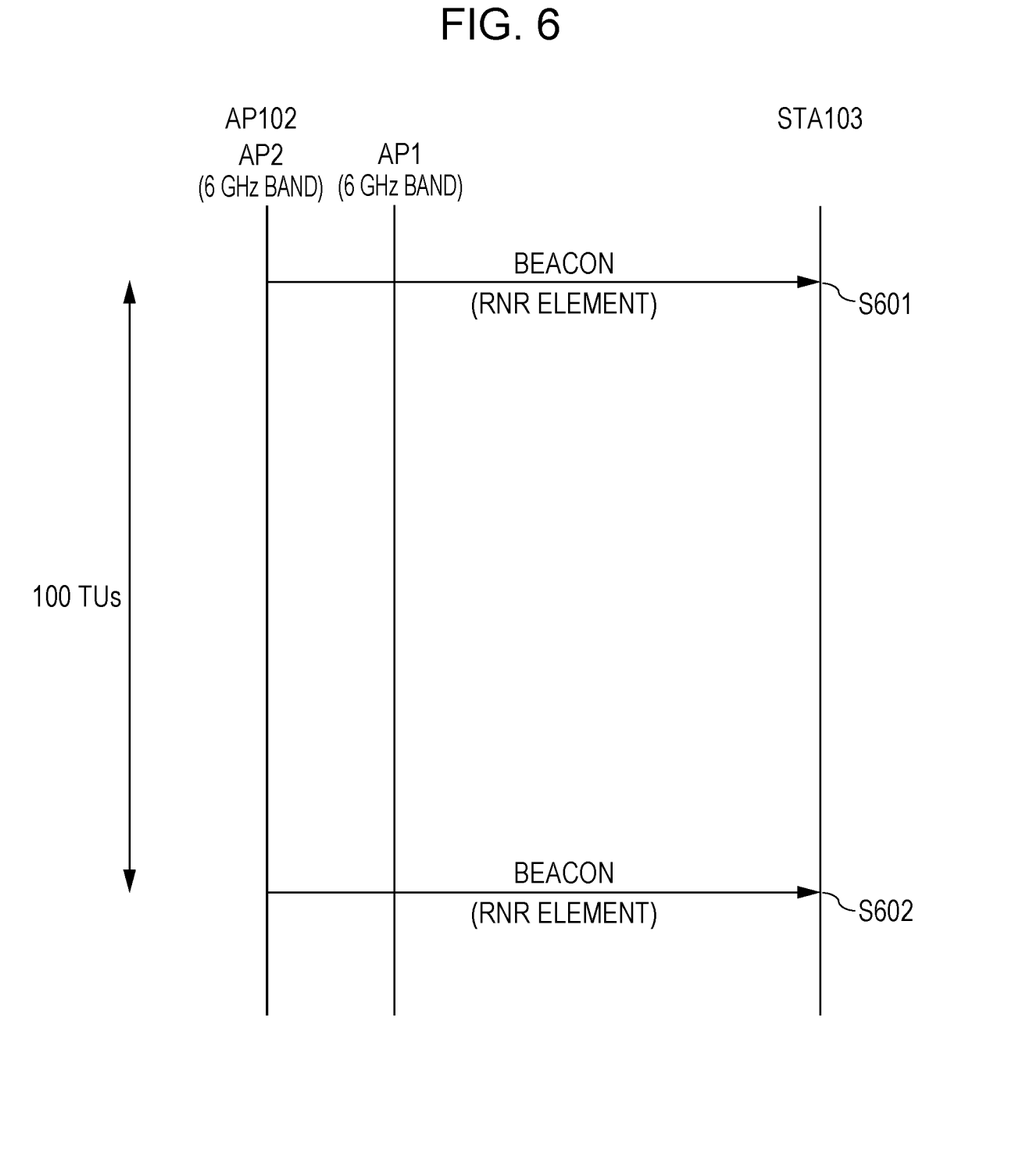
FIG. 6 is a sequence diagram illustrating an example of processing executed when the AP 102 communicates with the STA 103 via a plurality of links.

FIG. 6 is a sequence diagram illustrating another example of processing executed when the AP 102 communicates with the STA 103 via multiple links. In the example shown in FIG. 6, the AP 102 performs a multi-link communication. The processing of this sequence is started when the power of the AP 102 is turned on. Alternatively, the processing may be started in response to a user instructing the AP 102 to perform a multi-link communication. The AP 102 operates an AP1 and an AP 2 to perform multi-link communication with the STA 103. Note that the AP1 and AP2 operate in the 6 GHz band using frequency channels different from each other.

The AP 102 transmits a beacon frame using the AP2 (S601). The beacon frame transmitted in this step includes an RNR element including information common to the links established by the AP1 and the AP2. When 100 TUs has passed since the previous transmission of the beacon frame, the AP 102 again transmits a beacon frame using the AP 2 (S602). In this sequence, it is assumed that the AP 102 uses the AP2. However, the sequence may be performed using the AP1. In this example of the sequence, the AP 102 transmits neither an unsolicited probe response frame including an RNR element nor a FILS discovery frame containing an RNR element, but transmits beacon frames at intervals of 100 TUs.

As described above, when the AP 102 performs multi-link communication, the AP 102 transmits neither an unsolicited probe response frame nor a FILS discovery frame between adjacent transmissions of the beacon frame. This can reduce an overhead in communication.

Figure 7:
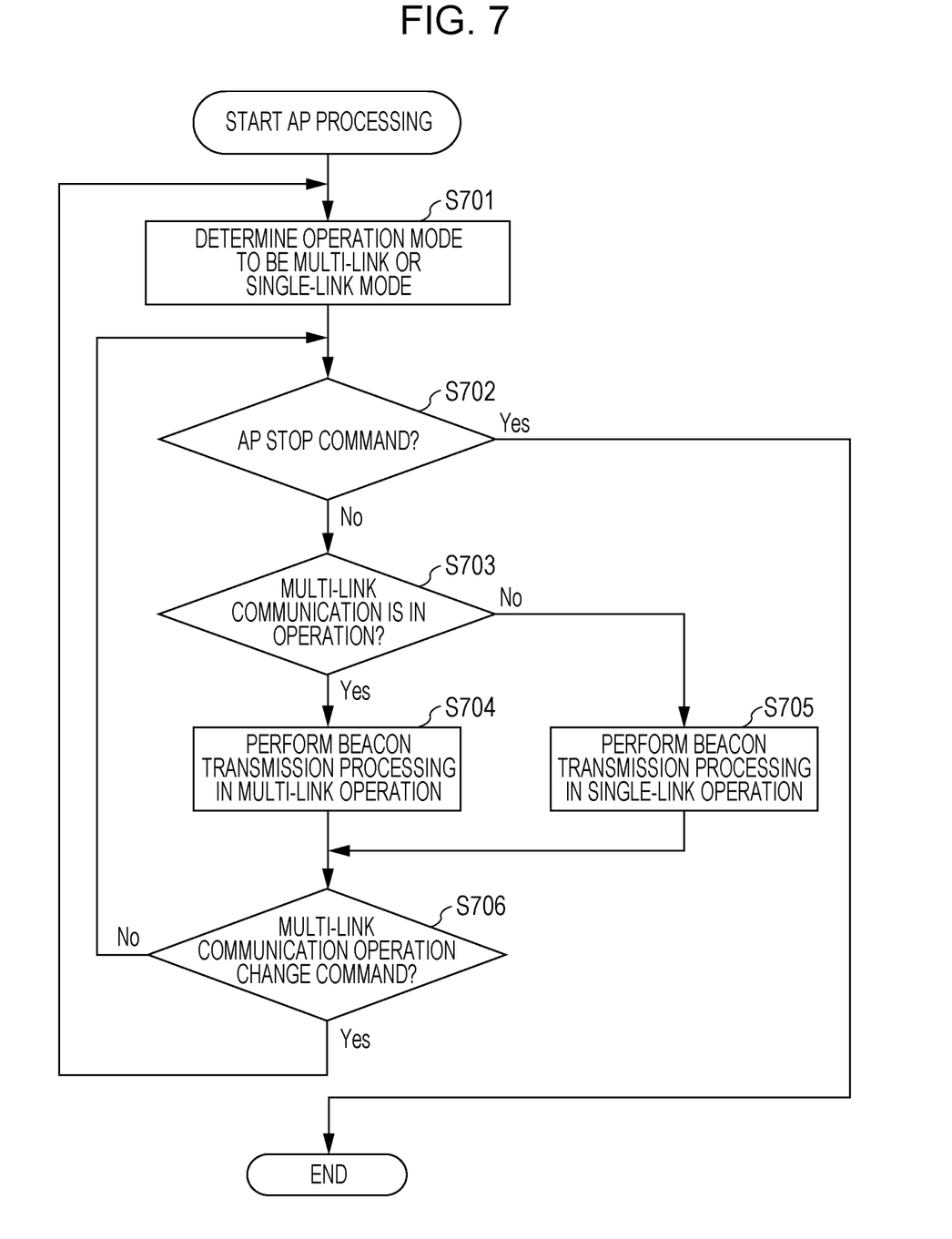
FIG. 7 is a flowchart illustrating processing executed when the AP 102 executes a multi-link communication or a single-link communication.

FIG. 7 is a flowchart illustrating processing executed by the control unit 202 by reading and executing a computer program stored in the storage unit 201 when the AP 102 executes multi-link communication or single-link communication.

This flowchart starts when the power of the AP 102 is turned on. Alternatively, the processing may be started in response to a user instructing the AP 102 to start communication.

First, the AP 102 determines that its operation mode is a multi-link or a single-link operation mode (S701). Whether the AP 102 performs the multi-link communication or single-link communication is determined by the user. Alternatively, the AP 102 may autonomously determine whether to perform multi-link communication or single-link communication based on the state of frequency channels and frequency bands, the size of data to be communicated, and/or the like.

Next, the AP 102 determines whether the AP 102 has received an AP stop instruction (S702). More specifically, the AP 102 determines whether the user has instructed the AP 102 to stop its operation as an AP. When the AP 102 is instructed to stop, the AP 102 determines Yes in this step, and stops the operation as an AP and ends the processing of this flowchart. In a case where the AP 102 is not instructed to stop, the AP 102 determines No in this step, and executes a process in S703.

The AP 102 determines whether the AP 102 is performing the multi-link communication operation (S703). In a case where the AP 102 is executing the multi-link communication, the AP 102 determines Yes in this step and performs a process in S704. On the other hand, in a case where the AP 102 is executing the single-link communication, the AP 102 determines No in this step and performs a process in S705.

The AP 102 executes the beacon frame transmission process in the multi-link operation (S704). Details of this step will be described later with reference to FIG. 9 or FIG. 10.

In a case where it is determined No in S703, the AP 102 executes the beacon frame transmission process in the single-link operation (S705). Details of this step will be described later with reference to FIG. 8.

After the AP 102 performs the process in S704 or the process in S705, the AP 102 determines whether an instruction to change the operation of the multi-link communication has been received (S706). More specifically, the AP 102 determines whether the AP 102 has received, from a user, an instruction to execute the multi-link communication. Alternately or additionally, the AP 102 may determine whether the AP 102 has received an instruction from the user to change the frequency channel, the frequency band, the mode, the number of links and/or the like of the multi-link communication. Instead of receiving these change instructions from the user, the AP 102 may autonomously make the changes based on the state of the communication being executed, the state of the frequency channel, and/or the like. When the AP 102 determines that the AP 102 has received a change instruction or when the AP 102 autonomously determines to make a change, the AP 102 determines Yes in this step and performs the process in S701 again. On the other hand, when the AP 102 determines that the AP 102 has not received a change instruction or when the AP 102 autonomously determines not to make a change, the AP 102 determines No in this step and performs the process in S702.

As shown in FIG. 7, the AP 102 switches the beacon frame transmission processing based on whether the multi-link communication or the single-link communication is being performed.

Figure 8:
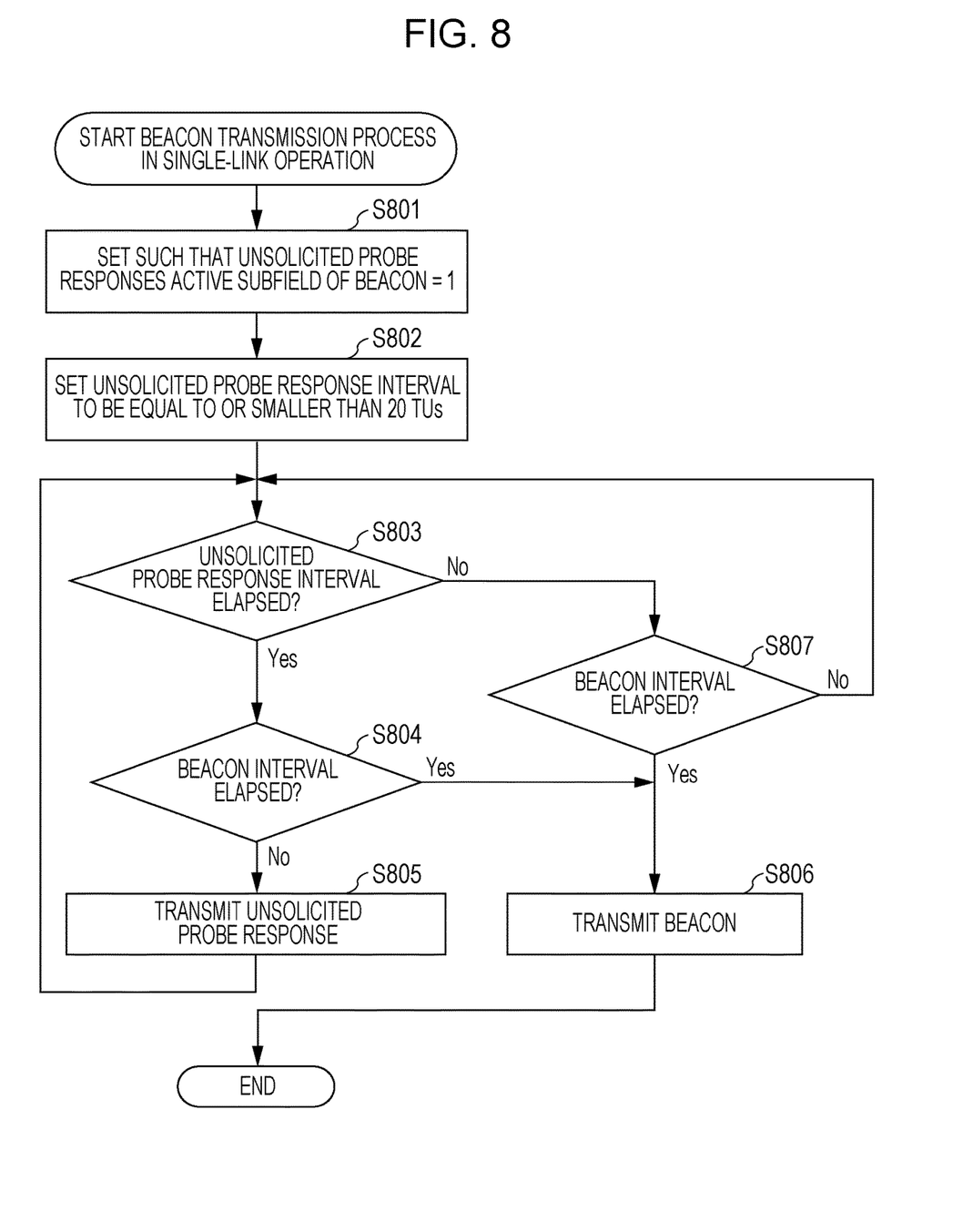
FIG. 8 is a flowchart illustrating processing executed when the AP 102 transmits a beacon frame in executing a single-link communication.
Figure 9:
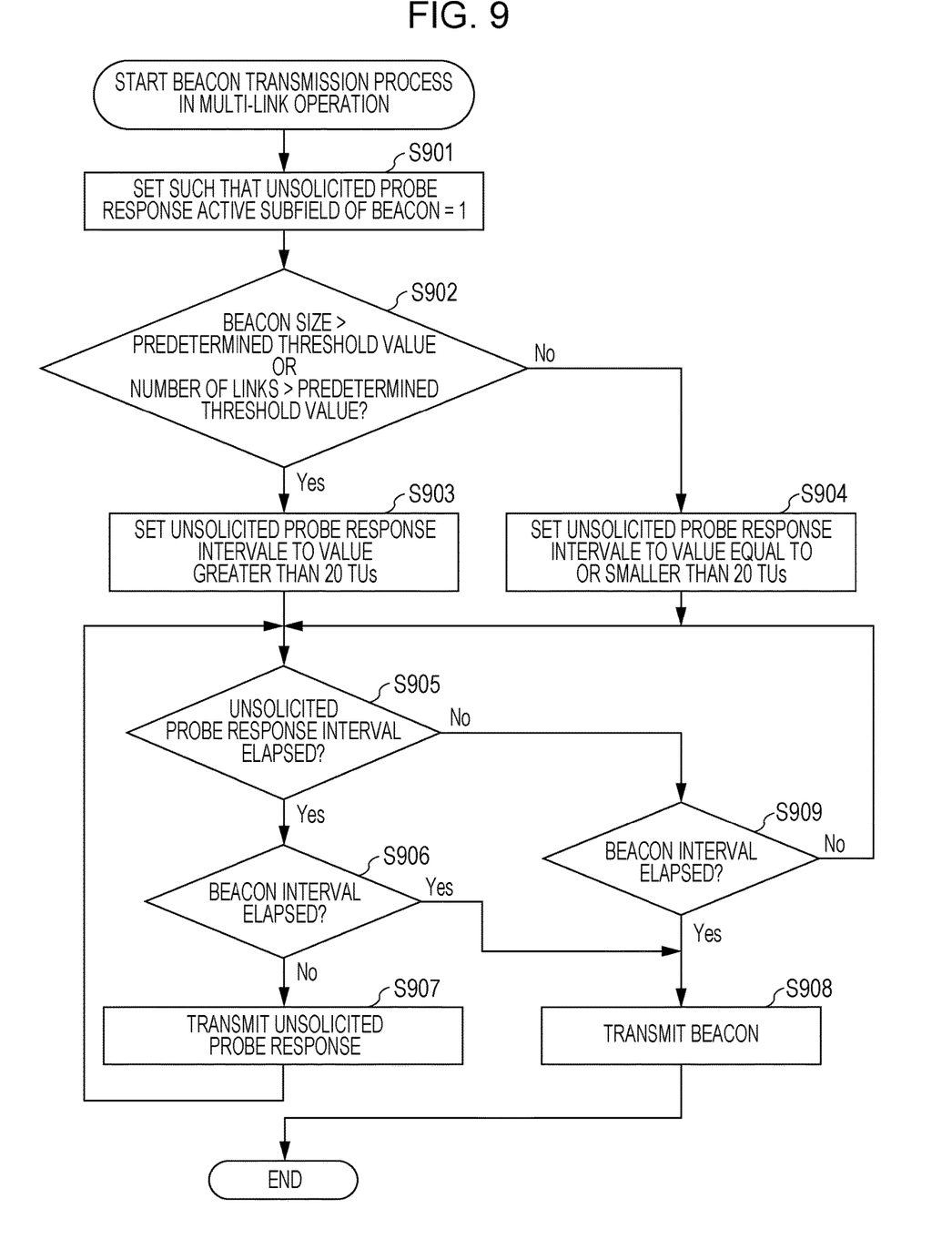
FIG. 9 is a flowchart illustrating processing executed when the AP 102 transmits a beacon frame in executing a multi-link communication.
Figure 10:
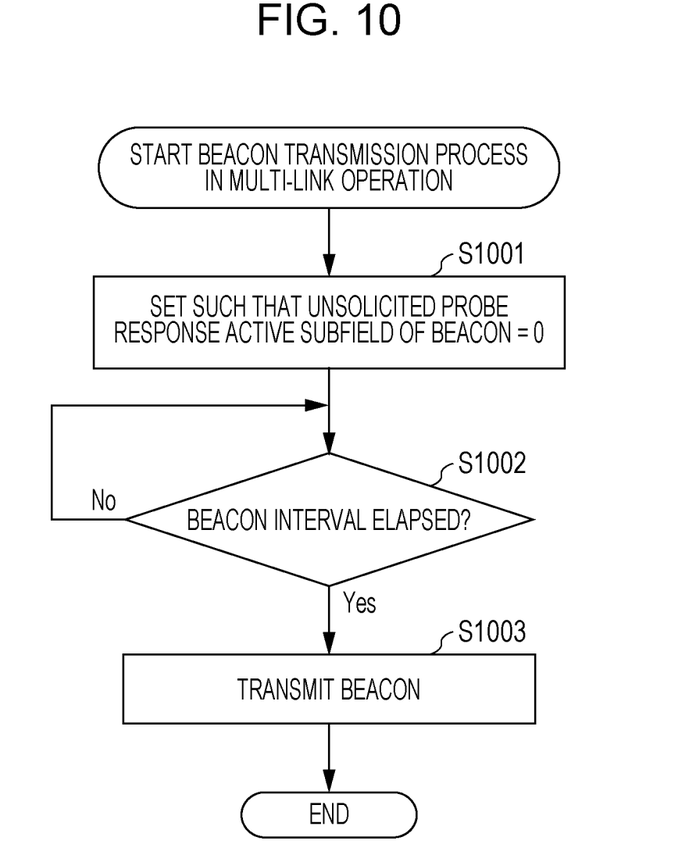
FIG. 10 is a flowchart illustrating another processing executed when the AP 102 transmits a beacon frame in executing a multi-link communication.

Note that in this flowchart and also in the flowcharts shown in FIGS. 8 to 10, only the processing of transmitting of beacon frames, unsolicited probe response frames, and FILS discovery frames is described and other processes are not shown, but processing which is not shown in these flowcharts may be performed. The AP 102 may perform processing such as transmission and reception of a data frame, transmission and reception of another management frame or control frame, in parallel with or between steps shown in FIGS. 7 to 10.

FIG. 8 is a flowchart illustrating processing executed by the control unit 202 by reading and executing a computer program stored in the storage unit 201 when the AP 102 transmits a beacon frame in the single-link communication.

The processing of this flowchart is started in response to the AP 102 starting the processing in S705 shown in FIG. 7.

First, the AP 102 incorporates, into a beacon frame, a neighbor report element or an RNR element in which the unsolicited probe responses active subfield is set to 1 (S801). This makes it possible for the AP 102 to notify that the unsolicited probe response frame is to be transmitted.

Next, the AP 102 sets the transmission interval for transmitting unsolicited probe response frames to 20 TUs or shorter (S802). Since the AP 102 is performing single-link communication, information of multiple APs regarding multi-link communication is not included in the unsolicited probe response frames. Therefore, even when the transmission interval of unsolicited probe response frames is set to 20 TUs or shorter, the communication overhead is small.

Next, the AP 102 determines whether the transmission interval of the unsolicited probe response frames has elapsed since the previous transmission of the beacon frame or the unsolicited probe response frame (S803). In a case where the transmission interval has not yet elapsed, the AP 102 determines No in this step and performs processing in S807. In a case where the transmission interval has elapsed, the AP 102 determines Yes in this step and performs processing in S804. The AP 102 determines whether the beacon frame transmission interval has elapsed since the previous transmission of the beacon frame (S807). Note that the beacon frame transmission interval of the AP 102 is preset as 100 TUs in the AP 102. Alternatively, any transmission interval may be set by the user. In a case where the beacon transmission interval has elapsed, the AP 102 determines Yes in this step and performs processing in S806. In a case where the beacon transmission interval has not yet elapsed, the AP 102 determines No in this step and again performs processing in S803.

The AP 102 determines whether the beacon frame transmission interval has elapsed since the previous transmission of the beacon frame (S804). In a case where the beacon transmission interval has elapsed, the AP 102 determines Yes in this step and performs processing in S806. In a case where the beacon transmission interval has not yet elapsed, the AP 102 determines No in this step and performs processing in S805.

The AP 102 transmits an unsolicited probe response frame (S805). After the AP 102 performs the processing in S805, the AP 102 performs again performs the determination in S803.

On the other hand, in a case where it is determined Yes in S804, the AP 102 transmits a beacon frame (S806). After the AP 102 performs the process in this step, the AP 102 ends the processing of the present flowchart.

Although in the processing in FIG. 8, the unsolicited probe response frame is transmitted, this is by way of example and not limitation. For example, a FILS discovery frame may be transmitted. In this case, the AP 102 skips the processing in S801.

FIG. 9 is a flowchart illustrating processing executed by the control unit 202 by reading and executing a computer program stored in the storage unit 201 when the AP 102 transmits a beacon frame in the multi-link communication.

The processing of this flowchart is started in response to the AP 102 starting the processing in S704 in FIG. 7.

The processing in S901 is similar to the processing in S801 in FIG. 8.

Next, the AP 102 determines whether the beacon frame size is greater than a predetermined threshold value for the case in which the beacon frame includes an RNR element containing information common to multiple links used in multi-link communication (S902), or whether the number of established links is greater than a predetermined threshold value. In a case where it is determined that the beacon frame size is greater than the predetermined threshold value or it is determined that the number of established links is greater than the predetermined threshold value, the AP 102 determines Yes in this step and performs processing in S903. On the other hand, in a case where it is determined that the beacon frame size is equal to or smaller than the predetermined threshold value or it is determined that the number of established links is equal to or smaller than the predetermined threshold value, the AP 102 determines No in this step and performs processing in S904. In this step, whether to determine the beacon frame size or the number of links may be selected by the user or may be preset in the AP 102. Alternatively, the AP 102 may perform both determinations. In this case when at least one of the determination results is Yes, the AP 102 may determine Yes in this step. Note that the predetermined threshold value for the beacon frame and the predetermined threshold value for the number of links may both be preset in the AP 102, or may be set by the user.

The AP 102 sets the transmission interval for transmitting unsolicited probe response frames to a value greater than 20 TUs (S903). The unsolicited probe response frame to be transmitted includes an RNR element including information common to multiple links used for multi-link communication.

On the other hand, in a case where it is determined No in S902, the AP 102 sets the transmission interval for transmitting unsolicited probe response frames to a value equal to or smaller than 20 TUs (S904). The unsolicited probe response frame to be transmitted includes an RNR element including information common to multiple links used for multi-link communication.

The processing in S905 to S909 is similar to the processing in S803 to S807 in FIG. 8.

As shown in FIG. 9, in a case where the beacon frame size is equal to or greater than the predetermined threshold value or when the number of links is equal to or greater than the predetermined threshold value, the AP 102 sets the transmission interval for transmitting the unsolicited probe response frames to a value greater than 20 TUs. This makes it possible to reduce the frequency of transmitting the unsolicited probe response frame including the RNR element containing information common to the plurality of links used in the multi-link communication, thereby reducing the communication overhead.

Although in the processing in FIG. 9, the unsolicited probe response frame is transmitted, this is by way of example and not limitation. For example, a FILS discovery frame may be transmitted. In this case, the AP 102 skips the processing in S901.

Alternatively, the determination in S902 may be skipped and the processing in S903 may be performed. In this case, in response to executing the multi-link communication, the AP 102 sets the transmission interval for transmitting the unsolicited probe response frames to a value greater than 20 TUs.

FIG. 10 is a flowchart illustrating processing different from the process illustrated in FIG. 9. This processing is also executed by the control unit 202 by reading and executing a computer program stored in the storage unit 201 when the AP 102 transmits a beacon frame in the multi-link communication. In the processing illustrated in the flowchart of FIG. 10, the AP 102 does not transmit any unsolicited probe response frame.

The processing of this flowchart is started in response to the AP 102 starting the processing in S704 in FIG. 7.

First, the AP 102 incorporates, into a beacon frame, a neighbor report element or an RNR element in which the unsolicited probe responses active subfield is set to 0 (S1001). This makes it possible for the AP 102 to notify that the unsolicited probe response frame is not to be transmitted.

In S1002, the AP 102 performs processing similar to the processing in S804 in FIG. 8. In a case where it is determined No in S1002, the AP 102 again performs the processing in S1002. On the other hand, in a case where it is determined Yes in S1002, the AP 102 performs processing in S1003.

In S1003, the AP 102 performs processing similar to the processing in 806 in FIG. 8.

Thus, as described above with reference to FIG. 10, when the multi-link communication is being executed, no unsolicited probe response frames are transmitted thereby suppressing the communication overhead.

Note that instead of suppressing transmission of the unsolicited probe response frames, the AP 102 may suppress transmission of FILS discovery frames. In this case, the AP 102 skips the processing in S1001 in this flow.

The AP 102 may be an apparatus capable of selecting the processing shown in FIG. 9 and the processing shown in FIG. 10 as a mode, or may be an apparatus capable of executing only one of these processes.

The processes shown in the flowcharts in FIGS. 7 to 10 may be executed when the AP 102 operates only in the 6 GHz band, and may not be executed when the AP 102 operates in the 2.4 GHz band and/or the 5 GHz band. Alternatively, the AP 102 may perform the processes shown in FIGS. 7 to 10 when at least one AP operates in the 6 GHz band.

At least part or all of the flowcharts of the AP 102 shown in FIGS. 7 to 10 may be realized by hardware. When hardware is used for realization, for example, a dedicated circuit may be generated on an FPGA based on a computer program for realizing the steps using, for example, a particular complier, and the resultant dedicated circuit may be used. FPGA is an abbreviation for Field Programmable Gate Array. Alternatively, a Gate Array circuit may be formed in a similar manner to the FPGA thereby achieving the realization using hardware. Alternatively, an ASIC (Application Specific Integrated Circuit) may be used for the realization.

The present invention may also be implemented by providing a program for realizing one or more functions of the embodiment to a system or an apparatus via a network or a storage medium, and reading out and executing the program by one or more processors in a computer disposed in the system or the apparatus. The present invention may also be implemented by a circuit (for example, ASIC) that realizes one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
   an establishment unit configured to establish a plurality of links with another communication apparatus via a plurality of different channels;
   a control unit configured to perform control such that in a case where a communication is being performed using the plurality of links established by the establishment unit, a FILS (Fast Initial Link Setup) discovery frame and/or an unsolicited probe response frame is not transmitted at an interval of 20 or smaller TUs (Time Units) and is transmitted at an interval of 20 or greater TUs, while in a case where a communication is not being performed using the plurality of links established by the establishment unit, a FILS discovery frame and/or an unsolicited probe response frame is transmitted at an interval of 20 or smaller Tus;
   a transmission unit configured to transmit a beacon frame including an unsolicited probe responses active subfield in which 1 is set as a value; and
   a first determination unit configured to determine whether a size of a beacon frame transmitted by the transmission unit is greater than a predetermined threshold value in a case where a communication is being performed using the plurality of links established by the establishment unit,
   wherein the control unit performs control such that in a case where the first determination unit determines that the size of the beacon frame is greater than the predetermined threshold value, a FILS discovery frame and/or an unsolicited probe response frame is transmitted at an interval greater than 20 TUs, while in a case where the first determination unit determines that the size of the beacon frame is equal to or smaller than the predetermined threshold value, a FILS discovery frame and/or an unsolicited probe response frame is transmitted at an interval equal to or smaller than 20 TUs.

2. The communication apparatus according to claim 1, further comprising second determination unit configured to determine whether the number of links established by the establishment unit is greater than a predetermined threshold value in a case where a communication is being performed using the plurality of links established by the establishment unit,
   wherein the control unit performs control such that in a case where the second determination unit determines that the number of the link is greater than the predetermined threshold value, a FILS discovery frame and/or an unsolicited probe response frame is transmitted at an interval greater than 20 TUs, while in a case where the second determination unit determines that the number of links is equal to or smaller than the predetermined threshold value, a FILS discovery frame and/or an unsolicited probe response frame is transmitted at an interval equal to or smaller than 20 TUs.

3. The communication apparatus according to claim 1, wherein in a case where a communication is being performed using the plurality of links established by the establishment unit, the FILS discovery frame includes information on a plurality of APs (Access Points) used by the communication apparatus.

4. The communication apparatus according to claim 1, wherein in a case where a communication is being performed using the plurality of links established by the establishment unit, the unsolicited probe response frame includes an RNR (Reduced Neighbor Report) element including information common to the plurality of links.

5. The communication apparatus according to claim 1, wherein the communication apparatus operates only in a 6 GHz band.

6. The communication apparatus according to claim 1, wherein the communication using the plurality of links is a multi-link communication according to the IEEE 802.11be standard.

7. A control method for a communication apparatus, comprising:
   establishing a plurality of links with another communication apparatus via a plurality of different channels;
   performing control such that in a case where a communication is being performed using the plurality of established links, a FILS discovery frame and/or an unsolicited probe response frame is not transmitted at an interval of 20 or smaller TUs (Time Units), while in a case where a communication is not being performed using the plurality of established links, a FILS discovery frame and/or an unsolicited probe response frame is transmitted at an interval of 20 or smaller Tus;
   transmitting a beacon frame including an unsolicited probe responses active subfield in which 1 is set as a value;
   determining whether a size of a transmitted beacon frame is greater than a predetermined threshold value in a case where a communication is being performed using the plurality of established links; and
   performing control such that in a case where it is determined that the size of the beacon frame is greater than the predetermined threshold value, a FILS discovery frame and/or an unsolicited probe response frame is transmitted at an interval greater than 20 TUs, while in a case where it is determined that the size of the beacon frame is equal to or smaller than the predetermined threshold value, a FILS discovery frame and/or an unsolicited probe response frame is transmitted at an interval equal to or smaller than 20 TUs.

8. A non-transitory computer-readable storage medium storing a program configured to cause a computer to function as each unit of the communication apparatus according to claim 1.

9. A communication apparatus comprising:
   an establishment unit configured to establish a plurality of links with another communication apparatus via a plurality of different channels;
   a control unit configured to perform control such that in a case where a communication is being performed using the plurality of links established by the establishment unit, a FILS discovery frame and/or an unsolicited probe response frame is not transmitted at an interval of 20 or smaller TUs (Time Units) and is transmitted at an interval of 20 or greater TUs, while in a case where a communication is not being performed using the plurality of links established by the establishment unit, a FILS discovery frame and/or an unsolicited probe response frame is transmitted at an interval of 20 or smaller Tus;
   a transmission unit configured to transmit a beacon frame including an unsolicited probe responses active subfield in which 1 is set as a value; and
   a determination unit configured to determine whether the number of links established by the establishment unit is greater than a predetermined threshold value in a case where a communication is being performed using the plurality of links established by the establishment unit,
   wherein the control unit performs control such that in a case where the determination unit determines that the number of the links is greater than the predetermined threshold value, a FILS discovery frame and/or an unsolicited probe response frame is transmitted at an interval greater than 20 TUs, while in a case where the second determination unit determines that the number of links is equal to or smaller than the predetermined threshold value, a FILS discovery frame and/or an unsolicited probe response frame is transmitted at an interval equal to or smaller than 20 TUs.

10. A control method for a communication apparatus, comprising:
    establishing a plurality of links with another communication apparatus via a plurality of different channels;
    transmitting a beacon frame including an unsolicited probe responses active subfield in which 1 is set as a value;
    performing control such that in a case where a communication is being performed using the plurality of established links, a FILS discovery frame and/or an unsolicited probe response frame is not transmitted at an interval of 20 or smaller TUs (Time Units) and is transmitted at an interval of 20 or greater TUs, while in a case where a communication is not being performed using the plurality of established links, a FILS discovery frame and/or an unsolicited probe response frame is transmitted at an interval of 20 or smaller Tus;
    determining whether the number of established links is greater than a predetermined threshold value in a case where a communication is being performed using the plurality of established links; and
    performing control such that in a case where it is determined that the number of the links is greater than the predetermined threshold value, a FILS discovery frame and/or an unsolicited probe response frame is transmitted at an interval greater than 20 TUs, while in a case where the it is determined that the number of links is equal to or smaller than the predetermined threshold value, a FILS discovery frame and/or an unsolicited probe response frame is transmitted at an interval equal to or smaller than 20 TUs.

11. A non-transitory computer-readable storage medium storing a program configured to cause a computer to function as each unit of the communication apparatus according to claim 9.

* * * * *